(12) United States Patent
Wakchaure

(10) Patent No.: US 8,351,169 B2
(45) Date of Patent: Jan. 8, 2013

(54) SYSTEM AND METHOD FOR PREVENTING, PROTECTING OLTC FROM FIRE AND/OR TRANSFORMER FROM EXPLOSION

(75) Inventor: Vijaykumar Kisanrao Wakchaure, Maharashtra (IN)

(73) Assignee: CTR Manufacturing Industries Limited, Pune, Maharashtra (IN)

( * ) Notice: Subject to any disclaimer, the term of this patent is extended or adjusted under 35 U.S.C. 154(b) by 239 days.

(21) Appl. No.: 12/811,263

(22) PCT Filed: Jan. 1, 2009

(86) PCT No.: PCT/IN2009/000003
§ 371 (c)(1),
(2), (4) Date: Aug. 5, 2010

(87) PCT Pub. No.: WO2009/116059
PCT Pub. Date: Sep. 24, 2009

(65) Prior Publication Data
US 2010/0296205 A1    Nov. 25, 2010

(30) Foreign Application Priority Data
Jan. 1, 2008   (IN) .................. 00010/MUM/2008

(51) Int. Cl.
H02H 5/04 (2006.01)
H02H 5/06 (2006.01)
H02H 7/04 (2006.01)

(52) U.S. Cl. ................. 361/35; 361/36; 361/37; 361/38

(58) Field of Classification Search .................... 361/35, 361/36, 37, 38
See application file for complete search history.

(56) References Cited

U.S. PATENT DOCUMENTS

| | | | | |
|---|---|---|---|---|
| 2,737,249 A * | 3/1956 | Pinkel et al. | ..................... | 169/45 |
| 3,793,559 A * | 2/1974 | Ristuccia | ......................... | 361/36 |
| 4,997,345 A * | 3/1991 | Dahlmann | ..................... | 417/282 |
| 6,804,092 B1 * | 10/2004 | Magnier | ......................... | 361/38 |
| 7,902,951 B2 * | 3/2011 | Findeisen | ....................... | 336/58 |
| 2010/0005856 A1 * | 1/2010 | Cunningham | ............... | 73/23.41 |

* cited by examiner

Primary Examiner — Rexford Barnie
Assistant Examiner — Zeev V Kitov
(74) Attorney, Agent, or Firm — Okamoto & Benedicto LLP

(57) ABSTRACT

The present invention relates to a system and method for preventing, protecting OLTC from fire and/or preventing, protecting and/or detecting explosion and/or resulting fire of electrical transformer (30) in advance before decomposition of combustible coolant fluid (11)/dielectric oil.

12 Claims, 4 Drawing Sheets

SYSTEM AND METHOD FOR PREVENTING, PROTECTING OLTC FROM FIRE AND/OR TRANSFORMER FROM EXPLOSION

FIELD OF INVENTION

The present invention relates to the field of preventing protecting OLTC from fire and/or prevention, protection and/or detection of an explosion and/or resulting fire in electrical transformers. More particularly, the present invention relates to a system/device, which prevents and detects the possibility of an explosion and/or resulting fire in advance, namely before decomposition of combustible coolant fluid/dielectric oil.

BACKGROUND AND PRIOR ART DESCRIPTION

Electrical transformers exhibit losses both in the windings and in the core, for which reason the heat produced needs to be dissipated. High-power transformers are thus generally cooled using a fluid such as oil. The oils used are dielectric and can ignite above a temperature of the order of 140° C. Since transformers are very expensive, particular attention must be paid to protecting them. An insulation fault first generates a strong electric arc, which prompts action by the electrical protection system, which trips the supply relay of the transformer (circuit breaker). The electric arc also causes consequent dissipation of energy, which generates release of gas from decomposition of the dielectric oil, in particular hydrogen and acetylene. After the gas has been released, the pressure inside the enclosure of the transformer increases very rapidly, hence an often very violent deflagration. The deflagration results in extensive tearing of the mechanical connections in the enclosure (bolts, welds) of the transformer, which brings the said gases into contact with the oxygen in the surrounding air. Since acetylene can spontaneously ignite in the presence of oxygen, combustion immediately starts and causes a fire to spread to other on-site equipments, which may also contain large quantities of combustible products. Explosions are due to short-circuits caused by overloads, voltage surges, progressive deterioration of the insulation, and insufficient oil level, the appearance of water or moisture or the failure of an insulating component. Further it is also observed that there are many instance were fire is started at On Load Tap Changer (OLTC) chamber and then resulting in explosion due to the spread of fire. Thus we see a need to monitor and prevent fire which occurs because of OLTC. Fire protection systems for electrical transformers are known in the prior art, and combustion or fire detectors actuate these. However, these systems are implemented with a significant time lag, when the oil of the transformer is already burning. It is then being necessary to make to with limiting the combustion to the equipment in question, and to prevent the fire from spreading to the neighboring plant. In order to slow down the decomposition of the dielectric fluid due to an electric arc, silicone oils may be used instead of conventional mineral oils. However, explosion of the enclosure of the transformer due to the increase in the internal pressure is delayed only by an extremely short time, of the order of a few milliseconds. This length of time does make it possible to engage means, which can prevent the explosion.

Further it is observed that in most of the fire breakout in the transformer, the source of fire is the OLTC. Hence it is important to first detect and protect OLTC. This would avoid fire breakup to other parts of the transformer. The reason for firebreak more common in OLTC is because of arcing inside the diverter switch.

The document WO-A-97/12379 discloses a method for prevention, protection and/or detection against explosion and/or resulting fire in an electrical transformer provided with an enclosure filled with combustible coolant fluid, by detecting a break in the electrical insulation of the transformer using a pressure sensor, depressurizing the coolant contained in the enclosure, using a valve, and cooling the hot parts of the coolant by injecting a pressurized inert gas into the bottom of the enclosure in order to stir the said coolant and prevent the oxygen from entering the enclosure of the transformer. This method is satisfactory and makes it possible to prevent the enclosure of the transformer from exploding upto some extent. However, the said method does not provide an indication in advance to take corrective measures. Also, by the time the corrective action takes place a significant amount of electrical insulation break down.

An electrical transformer exhibits inherent winding and core losses, generating heat which needs to be dissipated, by natural air cooling or natural oil cooling or forced air cooling or forced oil cooling. Larger electrical transformers are cooled generally using oil, which is a combustible coolant fluid. Larger electrical transformers have a device to detect and release the pressure developed due to expansion of the combustible coolant fluid inside the transformer tank and thereby prevent explosion.

Indian Patent Application IN189089 teaches a method and device for prevention, protection and/or detection of transformer against explosion and/or resulting fire. The patent provides a method of preventing, protecting and/or detecting an electrical transformer from deterioration by way of protecting, preventing and/or detecting said electrical transformer against explosion and/or resulting fire, said electrical transformer having an enclosure filled with a combustible coolant fluid said method comprising the steps of detecting a break in the electrical insulation of the transformer, using a pressure sensor means; partial draining of the coolant contained in the enclosure using a valve and; cooling the hot parts of the coolant by injecting a pressurized inert gas into the bottom of the enclosure in order to stir the coolant and flush the oxygen located in proximity. The said patent particularly refers to a pressure means for prevention, protection and/or detection of transformer against explosion and/or resulting fire, which is different from this invention. The patent fails in clearly mentioning about the nature of the pressure means.

U.S. Pat. No. 6,804,092 discloses a device for prevention, protection and detection against explosion and/or resulting fire of an electrical transformer comprising an enclosure filled with combustible coolant fluid, and a means for decompressing the enclosure of the transformer. The decompression means comprises a rupture element with integrated explosion detector provided with a retention part including first zones which have a reduced thickness in comparison with the rest of the retention part and are capable of tearing without fragmenting when the said element ruptures, and second zones which have reduced thickness in comparison with the rest of the retention part and are capable of folding without tearing when the said element ruptures. The said rupture element is capable of breaking when the pressure inside the enclosure exceeds a predetermined ceiling. The signal from an explosion detector integrated with the rupture disc triggers a cooling system and prevents oxygen from coming into contact with the explosive gases generated by the electric arc in contact with the oil.

U.S. Pat. No. 6,804,092 briefly elucidates regarding "Decompression/Means" wherein a rupture element tears with an increase in pressure in the transformer tank beyond a predetermined ceiling, which is not a foolproof system for detecting and preventing an explosion in an electrical transformer.

Both Prior Art systems discuss pressure developed and subsequent prevention measures through a rapture disc or "Pressure Means". In both the Prior Art systems namely IN189089 and U.S. Pat. No. 6,804,092 there are inherent disadvantages such as tearing occurring after significant delay from the occurrence the internal electric arc. Therefore it is likely that delay in detection of the pressure developed, explosion and or resulting fire in an electrical transformer take place. None of the prior art teaches the system or method which will detect or prevent occurring of tearing without delay.

Prior Art system disclosed in WO/2007/057916 does not seek protection for OLTC chamber. This invention also has disadvantage that in case of fire or chance of fire in the OLTC gets unnoticed.

Hence it is necessary to overcome the above drawbacks of both prior art and to invent a device and method for prevention, protection and or detection of an electrical transformer from explosion and/or resulting fire which takes preventive and protective measures with least delay.

OBJECTIVE OF THE INVENTION

The objective of the present invention is to provide a system, which eliminates the above-said drawbacks associated with prior system.

The primary objective of the present invention is to provide a system for preventing protecting OLTC from fire and/or which prevents, detects the possibility of explosion and/or resulting fire in advance, i.e. before decomposition of combustible coolant fluid/dielectric oil.

Yet another objective of the present invention is to provide a foolproof system and method for the preventing protecting OLTC from fire and/or prevention, protection and/or detection of an electrical transformer against explosion and/or resulting fire with least delay.

Yet another objective of the present invention is to provide a system for preventing protecting OLTC from fire and/or preventing, protecting and/or detecting explosion and/or resulting fire to a step up or step down transformer, which has an incoming voltage and outgoing voltage.

Yet another objective of the present invention is to provide a system, which is economical and having minimal intricacies involved during operation.

STATEMENT OF INVENTION

Accordingly the invention provides a system for preventing, protecting OLTC from fire and/or transformer from explosion in advance before decomposition of combustible coolant fluid (11)/dielectric oil, said system comprising: current sensing electrical relay (26) for determining difference of input current and output current and providing input to control unit if ratio of the input current to the output current exceeds predetermined limit, and/or one more detector to detect fire from OLTC chamber, one or more circuit breakers (24, 28) for isolating the electrical transformer from incoming source, one or more oil surge relay for sensing excessive oil surge in OLTC chamber (33), one or more Buchholz relays (18) for sensing excessive oil surge in transformer tank (14) and/or at least one RPRR (31) for detecting rate of change of pressure in the transformer tank, and/or at least one PRV (32) for detecting pressure in the transformer tank (14), and one or more control unit (1) for receiving inputs from the aforementioned parameters thereby optionally generating control signal to energize one or more lifting magnet (5) for draining of the combustible coolant fluid (11) through the drain valve and subsequently provide signal for injecting inert gas from the bottom of the electrical transformer tank and/or to top of OLTC chamber (33) through a nitrogen flow control valve for stirring the combustible coolant fluid (11); and it is also provides for a method for preventing, protecting OLTC from fire and/or transformer from explosion in advance before decomposition of combustible coolant fluid (11)/dielectric oil, said method comprising steps of: a) detecting difference between input current and output current upon crossing a predetermined level, b) detecting fire from OLTC chamber, c) isolating the electrical transformer from incoming source if ratio of the input current to the output current exceeds predetermined limit, d) detecting excessive oil surge for a transformer tank (14) using at least one Buchholz relay (18), monitoring pressure in the transformer tank as well as rate of change of pressure, using PRV and RPRR respectively, e) detecting excessive oil surge for a an OLTC chamber using at least one OSR, f) communicating the signals from the steps a, b, c and d to a control unit, g) energizing a one or more lifting magnet (5) using the control unit for draining of the combustible coolant fluid (11) using a G03 switch and subsequently injecting nitrogen gas from bottom of the electrical transformer tank (14) through a valve so as to stir the combustible coolant fluid (11) and reduce presence of oxygen when there are signals form steps a or b, c and d, and injecting nitrogen gas from top of the OLTC chamber through a valve so as to stir the combustible coolant fluid and reduce presence of oxygen when there are signals from steps b, c, d and e;

DETAIL DESCRIPTION OF THE FIGURES

Figure 1:
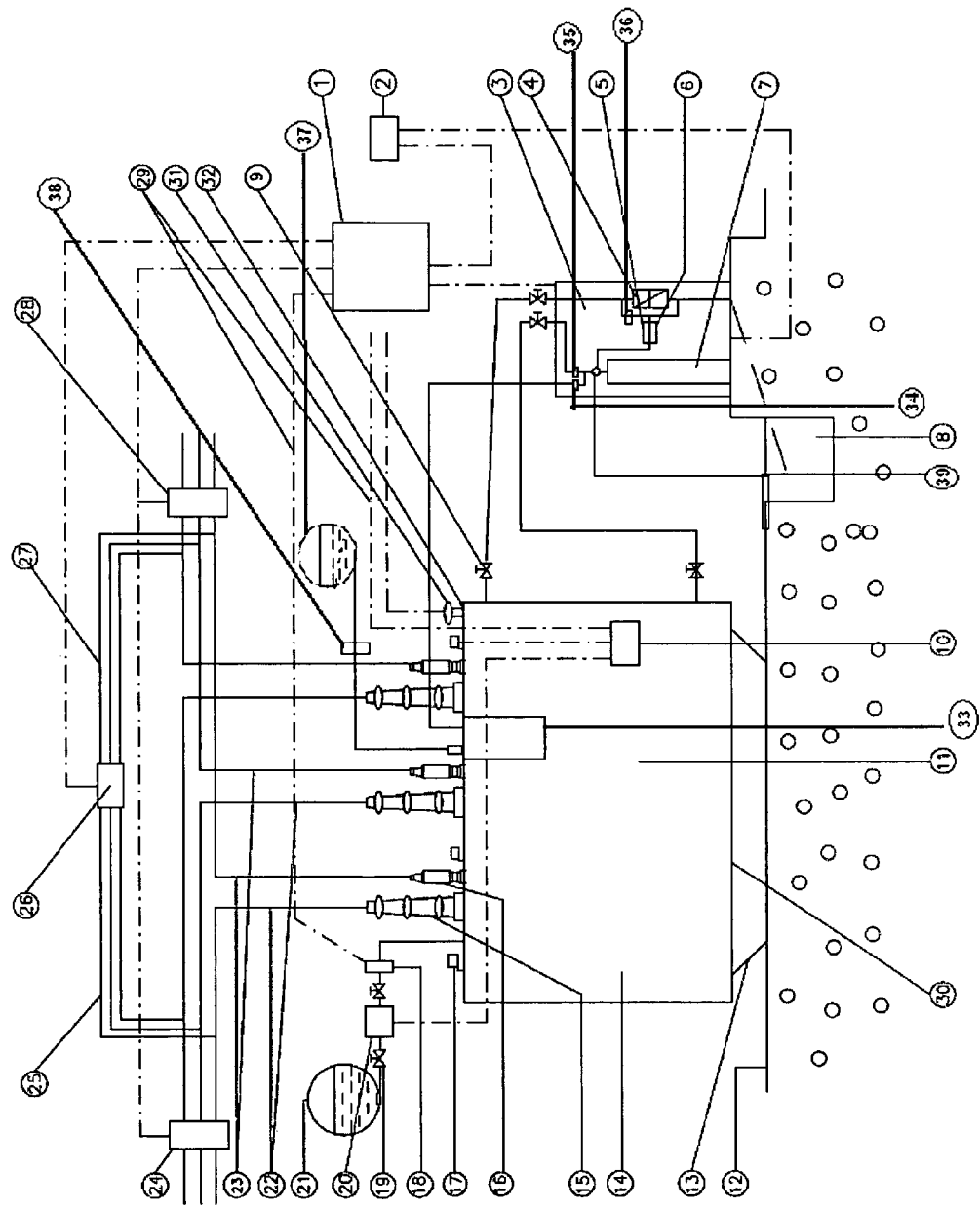
FIG. 1 is depicting the overall view of the system for prevention, protection and/or detection of the electrical transformer against explosion and/or resulting fire.
Figure 2A:
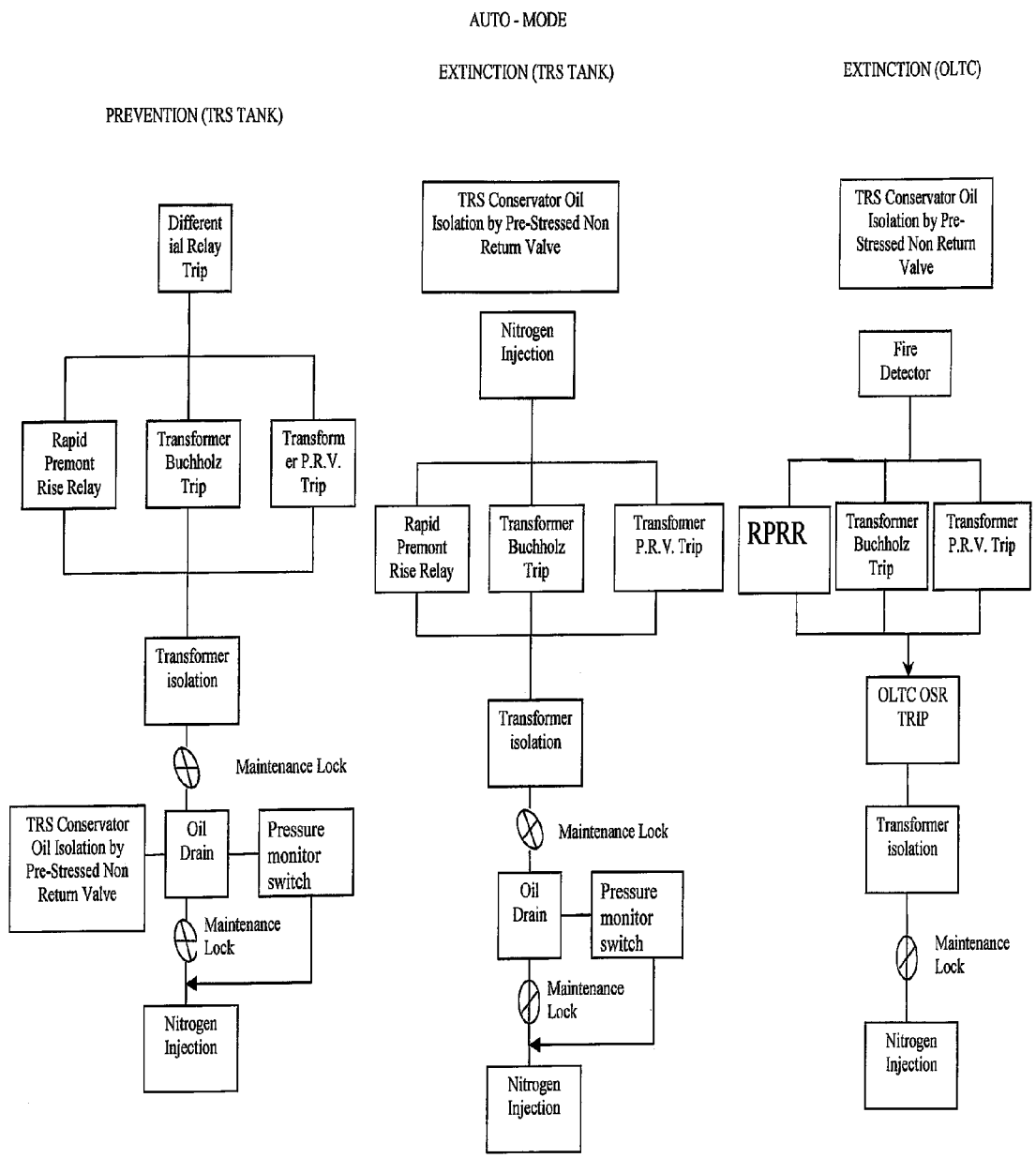
FIGS. 2A and 2B show a schematic view representing logic of the method of operation of the device according to the invention.
Figure 2B:
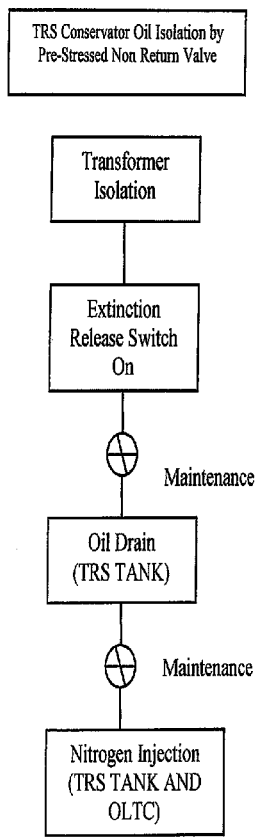
Figure 2B:
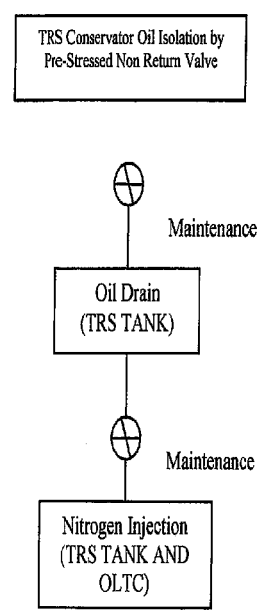
Figure 3:
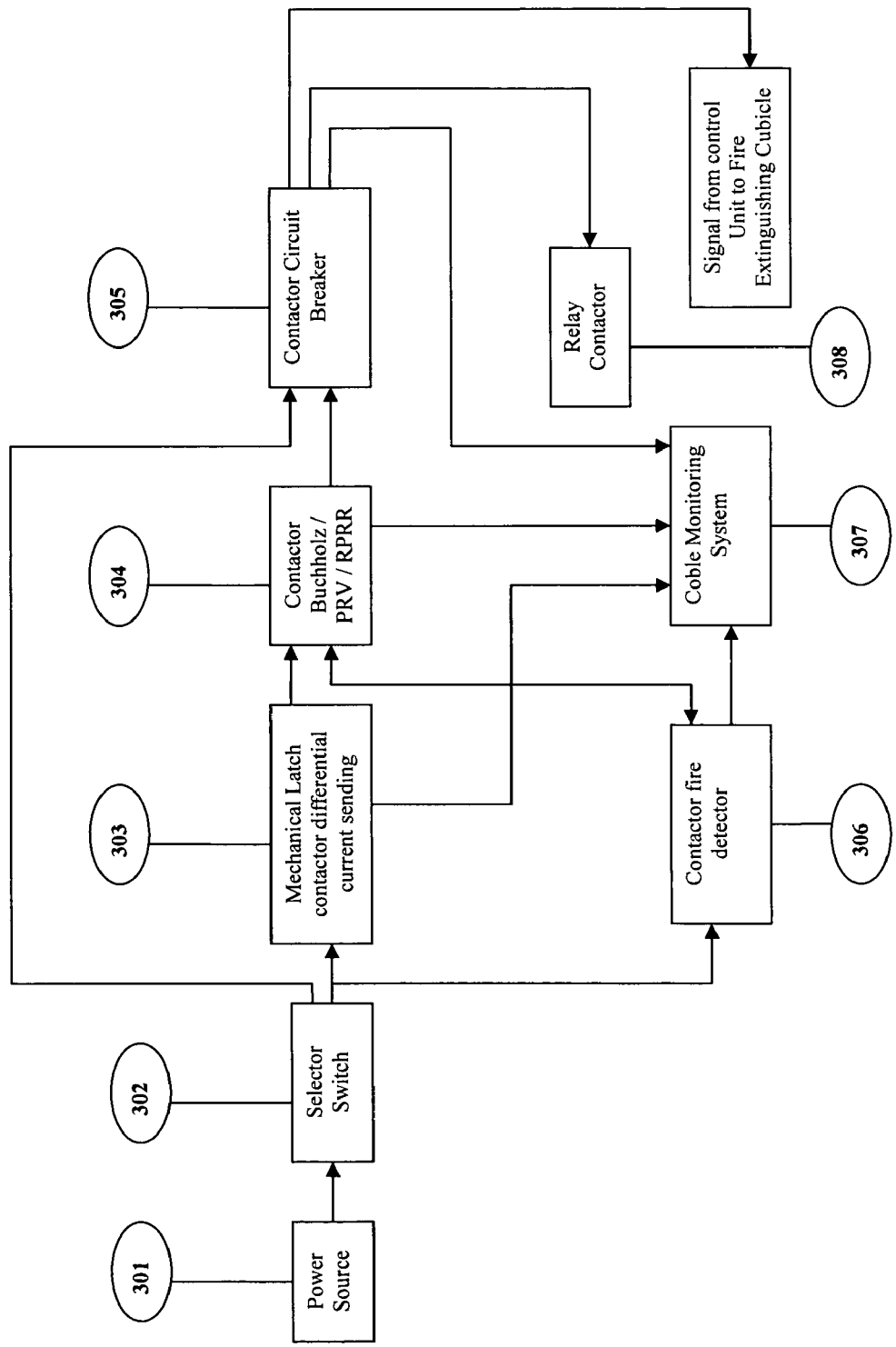
FIG. 3 is showing a schematic view representing lay out and logic of the control unit.

FIG. 1 is the overall view of the device for prevention, protection and/or detection of the electrical transformer against explosion and/or resulting fire. Referring to FIG. 1, the electrical transformer (30) comprises of an electrical transformer tank (14) with electrical conductors carrying high or low tension voltage (22) connected to high or low voltage transformer bushing (15) another high or low voltage conductor (23) is connected to the other high or low voltage transformer bushing (16) as the case may be. The electrical transformer tank (14) is filled with combustible coolant fluid (11). The electrical transformer (30) is connected to an electrical transformer conservator (21) communicating with the electrical transformer tank (14) through a pipe or conduit (19). The pipe or conduit (19) provided with Electrical Transformer Conservator Isolation Valve (TCIV) (20) closes the pipe or conduit (19) as soon as rapid movement of combustible coolant fluid (11) from the electrical transformer conservator (21) to electrical transformer tank (14) is observed. The pipe or conduit (19) is also fitted with a Buchholz relay

(18) for sensing gas generation and/or a surge observed in the combustible coolant fluid (11) from the electrical transformer tank (14) towards the electrical transformer conservator (21). Similar arrangement exist for OLTC chamber with OLTC conservator (37), and OLTC surge relay (38) to check rapid movement of combustible coolant fluid from OLTC diverter switch chamber (33) to the OLTC conservator (37). The surge relay (38) can also be replaced with a Buchholz relay. But since only surge as to be monitored we are using a surge relay.

Electrical conductor carrying high or low voltage (22) and electrical conductor carrying high or low voltage (23) as the case may be through which current passes to the transformer for step up or step down of voltage and inverse for the current, differential current sensing electrical relay (26) for measuring the differential current between incoming High or Low Voltage electrical conductor (22) and outgoing High or Low Voltage electrical conductor (23) as the case may be. A predetermined difference limit is set in the current level of the differential current sensing electrical relay (26). When the predetermined difference in the current level is exceeded, the differential current sensing electrical relay (26) will trip the electrical transformer (30) through the circuit breaker(s). Buchholz relay (18) & surge relay (38) also trips when there is sudden surge of the combustible coolant fluid. An output signal from the differential current sensing electrical relay (26) or the Buchholz relay (18) or surge relay (38) will trip the circuit breaker(s) on incoming (and if connected in parallel, outgoing) connections with the high and low voltage transformer bushing (15) and (16)), simultaneously giving a signal to the control unit (1). This control unit (1) only generates a control signal, to the oil drain valve (4) if signals from the differential current sensing electrical relay (26) isolating the electrical transformer (30) and a signal from the Buchholz relay (18) and surge relay (38) isolating the electrical transformer (30) are both received The actuation of the combustible coolant fluid (11) drain valve (4) occurs upon receipt of a control signal generated by the control unit (1) which energize the lifting magnet (5) to commence draining, and subsequent injection of nitrogen gas from the bottom of the transformer tank (14) through nitrogen release valve (6) thereby ensuring stirring of oil and bringing down presence of oxygen in the space above the combustible coolant fluid (11) in the tank and thereby prevents and protects the combustible coolant fluid (11) within the electrical transformer tank (14). In case of bursting of any of the high or low voltage transformer bushing, nitrogen gas rises upwards through any rupture or opening caused by explosion and creates an envelope around the opening to reduce presence of oxygen. The nitrogen gas is stored in a pressurized nitrogen cylinder (7). The injection of the nitrogen gas is also governed by the control signal generated by the control unit (1). Further system as shown in FIG. 1 is provided with other constructional parts like fire detectors (17) to ensure prevention, protection and/or detection of electrical transformer against explosion and/or resulting fire.

REFERENCE NUMERALS USED IN FIGURE ARE AS FOLLOW 1. control unit
2. supply device
3. Fire extinguishing cubicle (FEC)
4. Drain valve
5. Lifting magnet
6. Nitrogen release valve
7. Nitrogen cylinder
8. Oil pit
9. Transformer oil drain valve
10. Signal box
11. Combustible coolant fluid
12. Ground level
13. Wheels
14. electrical transformer tank
15. High voltage transformer bushing (or vice versa)
16. Low voltage transformer bushing (or vice versa)
17. Fire detectors
18. Buchholz relay
19. pipe or conduit
20. Electrical Transformer conservator isolation valve (TCIV)
21. Electrical Transformer conservator
22. Electrical conductor carrying high voltage (or vice versa)
23. Electrical conductor carrying low voltage (or vice versa)
24. Circuit breaker incoming
25. Incoming line
26. Differential current sensing electrical relay
27. Outgoing line
28. Circuit breaker outgoing
29. Cables
30. Electrical transformer.
31. Rapid Pressure Rise Relay (RPRR)
32. Pressure Relief Valve (PRV)
33. OLTC Diverter Switch Chamber
34. Nitrogen Flow Control Valve for OLTC
35. Nitrogen Flow Control Valve for Transformer
36. Pressure Monitor Switch
37) Conservator for OCTC
38) OLTC surge relay
39) safety relief valve

DETAIL DESCRIPTION OF THE INVENTION

Accordingly the present invention relates to a system for preventing, protecting OLTC from fire and/or transformer from explosion in advance before decomposition of combustible coolant fluid (11)/dielectric oil, said system comprising:
  a. current sensing electrical relay (26) for determining difference of input current and output current and providing input to control unit if ratio of the input current to the output current exceeds predetermined limit, and/or one more detector to detect fire from OLTC chamber,
  b. one or more circuit breakers (24, 28) for isolating the electrical transformer from incoming source,
  c. one or more oil surge relay for sensing excessive oil surge in OLTC chamber (33),
  d. one or more Buchholz relays (18) for sensing excessive oil surge in transformer tank (14) and/or at least one RPRR (31) for detecting rate of change of pressure in the transformer tank, and/or at least one PRV (32) for detecting pressure in the transformer tank (14), and
  e. one or more control unit (1) for receiving inputs from the aforementioned parameters thereby optionally generating control signal to energize one or more lifting magnet (5) for draining of the combustible coolant fluid (11) through the drain valve and subsequently provide signal for injecting inert gas from the bottom of the electrical transformer tank and/or to top of OLTC chamber (33) through a nitrogen flow control valve for stirring the combustible coolant fluid (11).

In one embodiment of the present invention the input current and the output current of differential current sensing electrical relay (26) are the current from high voltage conductor (22) and low voltage conductor (23) of the electrical transformer (30) respectively.

In one embodiment of the present invention the OLTC chamber (33) optionally has RPRR and/or PRV.

In one embodiment of the present invention the control unit receives signals from the RPRR and/or the PRV connected to the OLTC chamber (33) to generate control signal to energize one or more lifting magnet (5).

In one embodiment of the present invention nitrogen Flow control Valve for OLTC (34) and nitrogen Flow control Valve for Transformer (35) is used to allow predetermined rate of flow of nitrogen into OLTC chamber (34) and Transformer tank (14) respectively.

In one embodiment of the present invention the electrical transformer tank (14) is isolated from the electrical transformer conservator (21) by a Conservator Isolation Valve (TCIV) (20).

In one embodiment of the present invention time taken to generate the control signal from control unit (1) and draining the combustible coolant fluid (11) through the drain valve (4) and subsequently injecting of inert gas from the bottom of the electrical transformer tank (14) is carried out within a time period in the range of 31 to 700 milliseconds.

In one embodiment of the present invention a pressure monitor switch (36) triggers one or more lifting magnet to inject nitrogen into the transformer tank (14) when the pressure in the transformer tank (14) falls below a predetermined value during draining of the combustible coolant fluid.

In one embodiment of the present invention the system further comprise safety relief valve (39) to release nitrogen gas pressure to atmosphere when the pressure cross a predetermined limit.

The present invention is also related to a method for preventing, protecting OLTC from fire and/or transformer from explosion fire in advance before decomposition of combustible coolant fluid (11)/dielectric oil, said method comprising steps of:

a) detecting difference between input current and output current upon crossing a predetermined level,
b) detecting fire from OLTC chamber,
c) isolating the electrical transformer from incoming source if ratio of the input current to the output current exceeds predetermined limit,
d) detecting excessive oil surge for a transformer tank (14) using at least one Buchholz relay (18), monitoring pressure in the transformer tank as well as rate of change of pressure, using PRV and RPRR respectively,
e) detecting excessive oil surge for a an OLTC chamber using at least one OSR,
f) communicating the signals from the steps a, b, c and d to a control unit,
g) energizing a one or more lifting magnet (5) using the control unit for draining of the combustible coolant fluid (11) using a G03 switch and subsequently injecting nitrogen gas from bottom of the electrical transformer tank (14) through a valve so as to stir the combustible coolant fluid (11) and reduce presence of oxygen when there are signals form steps a or b, c and d, and
h) injecting nitrogen gas from top of the OLTC chamber through a valve so as to stir the combustible coolant fluid and reduce presence of oxygen when there are signals from steps b, c, d and e;

In one embodiment of the present invention in step (g) the electrical transformer tank (14) is isolated from the electrical transformer conservator (21) by a Conservator Isolation Valve (TCIV) (20).

In one embodiment of the present invention releasing, the nitrogen gas pressure to atmosphere when the injecting pressure exceeds a predetermined limit.

Experiments have shown that the imbalance of incoming current and outgoing current in an electrical transformer (30) is measured by a differential current sensing electrical relay which detects the difference between incoming and outgoing current. As soon as a predetermined limit of imbalance in incoming and outgoing current or vice versa is exceeded, the differential current sensing electrical relay will trip giving a signal to the incoming and outgoing circuit breakers connected to the electrical transformer (30) to trip and the electrical transformer will be isolated from the incoming source (input voltage to the transformer). (and also outgoing source, in case the electrical transformer outgoing is connected to another electrical transformer outgoing in parallel). Also, if there is a surge in the combustible coolant fluid due to a sudden turbulence build up, it is detected by the Buchholz relays which is present for both electric transformer conservator and OLTC conservator. There can be one or more Buchholz relays for the transformer. For OLTC an oil surge relay (OSR) can be used instead of Buchholz relay. At least on OSR is used of OLTC and depending upon the need there can be more than one OSR used for an OLTC. The Buchholz relay, OSR, RPRR, PRV will also give a signal to the incoming and outgoing circuit breakers of the electrical transformer to trip and the electrical transformer will be isolated. RPRR is provides the signal when the rapid change in pressure within the transformer, crosses a predetermined level. PRV provides the signal when the pressure within the transformer crosses a predetermined limit. These predetermined limits are determined such that the transformer is safe. Further, it is also taken care that OLTC chamber and/or electric transformer is fixed rapid pressure raise relay RPRR to monitor rapid raise in pressure. This will help in releasing the pressure when the rate of change of the pressure exceeds a predetermined safe value. This value is fixed depending upon the quantity of oil, size of electric transformer or chamber, volume etc. The RPRR is also monitored and used to detect and prevent fire. The control unit thus receives signal from the Buchholz relay, OSR, RPRR, PRV, current sensing electrical relay and circuit breakers. The control unit provides signal to release inert gas in to the OLTC chamber wherein the gas is release from top of the chamber. This will help in cutting of the fire much faster as compared to if the gas is released from the bottom of the OLTC chamber. It is seen that oil spells from the top of the chamber thus resulting in fire all around. This can be avoided and fire prevention is much, effective when the gas is released from the top of the OLTC chamber. There is need for draining of combustible coolant fluid from the electric transformer for which G03 switch is used. The control unit also initiates this process. In case if this switch fails to operate we have a pressure monitory switch (36) which will trigger an alternative switch (5) when a predetermined pressure is exceeded to drain the combustible coolant fluid. The method for prevention, protection and/or detection of an electrical transformer against explosion and/or resulting fire, where the electrical transformer has an enclosure filled with a combustible coolant fluid. The method comprises acts of Detecting the difference between input current and output current crossing a predetermined level by using a differential current sensing electrical relay (26). Detecting excessive oil surge for a transformer tank (14) and for an OLTC using at least one Buchholz relay (18) and/or OSR respectively. Monitoring pressure in the transformer as well as the rate of change of pressure using PRV and RPRR respectively. Isolating the electrical transformer from the incoming source using Circuit breakers (24, 28). Communicating output signals form the differential current sensing electrical relay, Circuit breaker, Buchholz relay, OSR, RPRR and PRV to a control unit. Energize a lifting magnet (5) for draining of the combustible coolant fluid (11) using a G03 switch and/or Pressure switch and subsequently injects nitrogen gas from the bottom of the electrical transformer tank (14) through a valve so as to stir the combustible coolant fluid (11) and reduce presence of oxygen and also injects nitrogen gas from the top of the OLTC chamber through a valve so as to stir the combustible coolant fluid and reduce presence of oxygen; A control unit (1) would generate the control signal to activate draining of the combustible coolant fluid (11) and injection of nitrogen gas for commencing preventative, protective and/or detective measures against likely explosion and/or resulting fire in an electrical transformer (30).

Further, according to present invention nitrogen gas is stored in a pressurized cylinder (7) and injection of the same is carried out at a predetermined rate is controlled by a valve, which is actuated by the control signal generated by the control unit (1).

In addition there is also a possibility that the nitrogen cylinder and pressure reducer which is used to inject nitrogen gas in to transformer tank (14) or OLTC (34) is subjected to various temperature conditions. Thus when there is a rise in temperature the compressed nitrogen gas injection pressure within the regulator and hosepipe expands. If the injection pressure in the regulator assembly rises more than a pre determined level there is a chance of explosion or leakage into transformer tank (14). Hence the excess pressure is timely released into atmosphere through safety relief valve (39) of pressure regulator.

Nitrogen Flow control Valve for OLTC (34) and Nitrogen Flow control Valve for Transformer (35) is used to allow predetermined rate of flow of nitrogen into OLTC (34) and Transformer tank (14) which is depending on dimension and oil capacity.

RPRR (31) sensing device for rate of rise of pressure during transformer internal fault condition and will give trip command to Circuit breaker (24 and 28) to isolate incoming and outgoing supply to transformer. PRV (32) is pressure sensing device and on attaining certain abnormal predetermined pressure during transformer internal fault, will give trip command to Circuit breaker (24 and 28) to isolate incoming and outgoing supply to transformer (30).

ADVANTAGE OF THE INVENTION

1. The present invention is capable to prevent and detects the possibility of explosion and/or resulting fire in advance, i.e. before decomposition of combustible coolant fluid (11)/dielectric oil.
2. Another advantage of the present invention relates to provide a foolproof system and method for the prevention, protection and/or detection of an electrical transformer (30) against explosion and/or resulting fire with least delay.
3. Yet another advantage of the present invention can be used for a step up or step down transformer, which has an incoming voltage and outgoing voltage.
4. Yet another advantage of the present invention is that the system is devoid of pressure sensors, temperature sensors or vapor sensors.

I claim:

1. A system for preventing, protecting On Load Tap Changer (OLTC) from fire and/or transformer from explosion in advance before decomposition of combustible coolant fluid (11)/dielectric oil, said system comprising:
    a. current sensing electrical relay (26) for determining difference of input current and output current and providing input to control unit if ratio of the input current to the output current exceeds predetermined limit, and/or one more detector to detect fire from OLTC chamber,
    b. one or more circuit breakers (24, 28) for isolating the electrical transformer from incoming source,
    c. one or more oil surge relay for sensing excessive oil surge in OLTC chamber (33),
    d. one or more Buchholz relays (18) for sensing excessive oil surge in transformer tank (14) and/or at least one Rapid Pressure Rise Relay (RPRR) (31) for detecting rate of change of pressure in the transformer tank, and/or at least one Pressure Relief Valve (PRV) (32) for detecting pressure in the transformer tank (14), and
    e. one or more control unit (1) for receiving inputs from the aforementioned parameters thereby optionally generating control signal to energize one or more lifting magnet (5) for draining of the combustible coolant fluid (11) through the drain valve and subsequently provide signal for injecting inert gas from the bottom of the electrical transformer tank and/or to top of OLTC chamber (33) through a nitrogen flow control valve for stirring the combustible coolant fluid (11).

2. The system as claimed in claim 1, wherein the input current and the output current of differential current sensing electrical relay (26) are the current from high voltage conductor (22) and low voltage conductor (23) of the electrical transformer (30) respectively.

3. The system as claimed in claim 1, wherein the OLTC chamber (33) optionally has RPRR and/or PRV.

4. The system as claimed in claims 1 and 3, wherein the control unit receives signals from the RPRR and/or the PRV connected to the OLTC chamber (33) to generate control signal to energize one or more lifting magnet (5).

5. The system as claimed in claim 1, wherein N2 Flow control Valve for OLTC (34) and N2 Flow control Valve for Transformer (35) is used to allow predetermined rate of flow of N2 into OLTC chamber (34) and Transformer tank (14) respectively.

6. The system as claimed in claim 1, wherein the electrical transformer tank (14) is isolated from the electrical transformer conservator (21) by a Conservator Isolation Valve (TCIV) (20).

7. The system as claimed in claim 1, wherein time taken to generate the control signal from control unit (1) for draining the combustible coolant fluid (11) through the drain valve (4) and subsequently injecting inert gas from the bottom of the electrical transformer tank (14) is carried out within a time period in the range of 31 to 700 milliseconds.

8. The system as claimed in claim 1, wherein a pressure monitor switch (36) triggers one or more lifting magnet to inject nitrogen into the transformer tank (14) when the pressure in the transformer tank (14) falls below a predetermined value during draining of the combustible coolant fluid.

9. The system as claimed in claim 1, further comprise safety relief valve (39) to release nitrogen gas pressure to atmosphere when the pressure cross a predetermined limit.

10. A method for preventing, protecting transformer On Load Tap Changer (OLTC) from fire and/or transformer from explosion in advance before decomposition of combustible coolant fluid (11)/dielectric oil, said method comprising steps of:
    a) detecting difference between input current and output current upon crossing a predetermined level,
    b) detecting fire from OLTC chamber,
    c) isolating the electrical transformer from incoming source if ratio of the input current to the output current exceeds predetermined limit, d) detecting excessive oil surge for a transformer tank (14) using at least one Buchholz relay (18), monitoring pressure in the transformer tank as well as rate of change of pressure, using Pressure Relief Valve (PRV) and Rapid Pressure Rise Relay (RPRR) respectively, e) detecting excessive oil surge for a an OLTC chamber using at least one Oil Surge Relay (OSR), f) communicating the signals from the steps a, b, c and d to a control unit, and g) energizing a one or more lifting magnet (5) using the control unit for draining of the combustible coolant fluid (11) and subsequently injecting nitrogen gas from bottom of the electrical transformer tank (14) through a valve so as to stir the combustible coolant fluid (11) and reduce presence of oxygen when there are signals form steps a or b, c and d, and h) injecting nitrogen gas from top of the OLTC chamber through a valve so as to stir the combustible coolant fluid and reduce presence of oxygen when there are signals from steps b, c, d and e.

11. The method as claimed in claim 10, wherein in step (g) the electrical transformer tank (14) is isolated from the electrical transformer conservator (21) by a Conservator Isolation Valve (TCIV) (20).

12. The method as claimed in claim 10, wherein releasing the nitrogen gas pressure to atmosphere when the injecting pressure exceeds a predetermined limit.

* * * * *